Patented Aug. 15, 1933

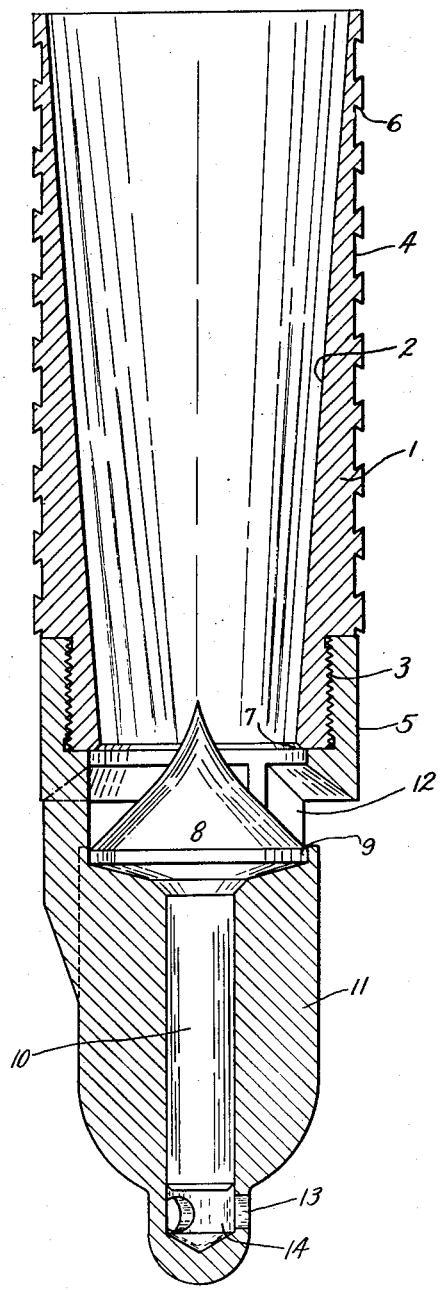

1,922,396

UNITED STATES PATENT OFFICE 1,922,396

PNEUMATIC SWAB PLUNGER

Norman H. Ricker, Houston, Tex., assignor to Hughes Tool Company, Houston, Tex., a Corporation of Texas Application February 16, 1931. Serial No. 516,158

3 Claims. (Cl. 103—52)

My invention relates to swab plungers for use in raising liquid from deep wells. The device is adapted for use with pneumatically operated fluid lift installations such as is disclosed in my co-pending application No. 448,832, filed May 1st, 1930, patented Dec. 15, 1931, No. 1,836,874.

It is an object of the invention to provide a plunger for pneumatic swabs which will clear itself of material which might tend to engage between the plunger and the wall of the eduction tube and thus clog its action.

I contemplate making the outer diameter of the plunger such that it will have a close sliding fit with the eduction tube but I provide circumferential grooves in the periphery of the plunger body in which the sand or other material which might clog the action of the plunger may be received and thus not interfere with its action.

It is a further object to provide the said grooves with undercut edges whereby the walls of the eduction tube may be scraped to assure that the interior be free of any accumulations which might obstruct the action of the plunger.

In the drawing is shown a central longitudinal section through a swab plunger with my invention shown thereon.

The plunger comprises a tubular body 1, the interior wall 2 of which converges downwardly. The outer periphery is cylindrical but is cut with a series of spaced grooves 4 therein. The lower end is reduced in diameter and threaded at 3 to connect with a valve cage 5. The grooves 4 may have their side walls radial but I prefer to undercut the said wall, as shown, to form an outer scraping edge 6.

The cage 5 is of slightly smaller outer diameter than is the body of the plunger, and its inner diameter is slightly greater than that of the inner passage through the body. The lower end of the body within the cage is beveled at 7 to form a seat for the upwardly closing valve 8.

The valve 8 has its head tapered upwardly to a point, as shown, to provide a streamline passage around it for the fluid. It is cylindrical at 9 and the lower side is tapered downwardly to the stem 10 which projects downwardly within the support 11.

The support 11 is connected with the cage 5 by downwardly extending legs 12 on the cage connected with the upper end of the support. Said support tapers at its lower end to form a streamline outer wall and the lower extremity has openings 13 leading to a small chamber 14 below the valve stem thus allowing access of fluid to the lower end of the stem. The upper end of the support is recessed to receive the head of the valve and to prevent the flow of liquid around the valve from causing the closing of the valve.

In the operation of the valve, the same will be moved to the upper end of the eduction tube and will then drop back again to the lower end. As the lifting of the plunger is accomplished through pneumatic pressure, it must fit the eduction tube close enough to prevent material leakage. When this is done, however, the solid materials such as sand, are apt to get between the swab and the tube and set up undue friction. But with the plunger formed as shown herein, the sides of the grooves scrape the walls of the tube and maintain it smooth and free of sand or grit. The clogging of the plunger is thus eliminated and better sealing effect about the plunger may be provided without danger of the plunger sticking in the tube.

What I claim as new is:

1. A swab plunger comprising a tubular body cylindrical on its outer periphery, said body being formed with circumferential grooves therein, the side walls of said grooves being undercut to form scraping edges thereon, a valve seat at its lower end and a normally open valve supported below said seat.

2. A swab plunger including a tubular body cylidrical on its outer surface and formed with grooves therein, the sides of said grooves converging outwardly and being provided with edges adapted to scape the walls of the eduction tube and carry the scraping to the upper end of said eduction tube.

3. A swab plunger, including a body having a wall tapering in thickness upwardly, the outer surface having a plurality of spaced circumferential recesses therein to receive foreign material, the edges of said grooves being formed to scrape the tube in which it works, and a valve below said body.

NORMAN H. RICKER.